Oct. 15, 1968   D. G. WILLIAMS   3,405,823
HYDRAULIC LOCKING MEANS FOR SHIFTABLE BACKHOE
Filed Jan. 11, 1966   5 Sheets-Sheet 1
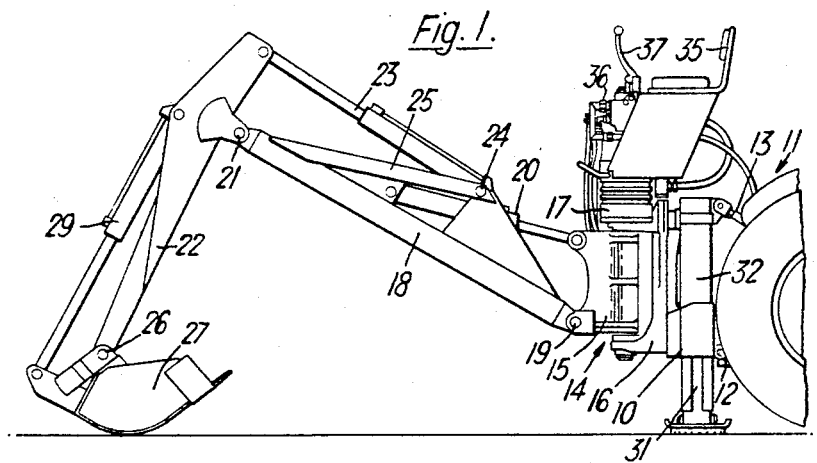
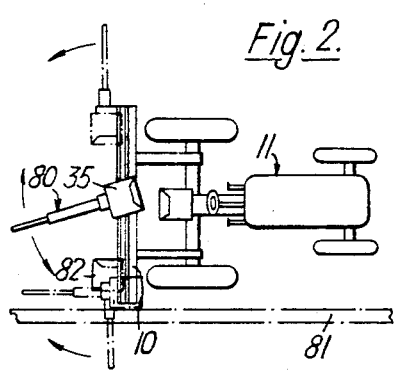
Inventor
DERRICK GEOFFREY WILLIAMS
By
Tweedale & Gerhardt
Attorneys

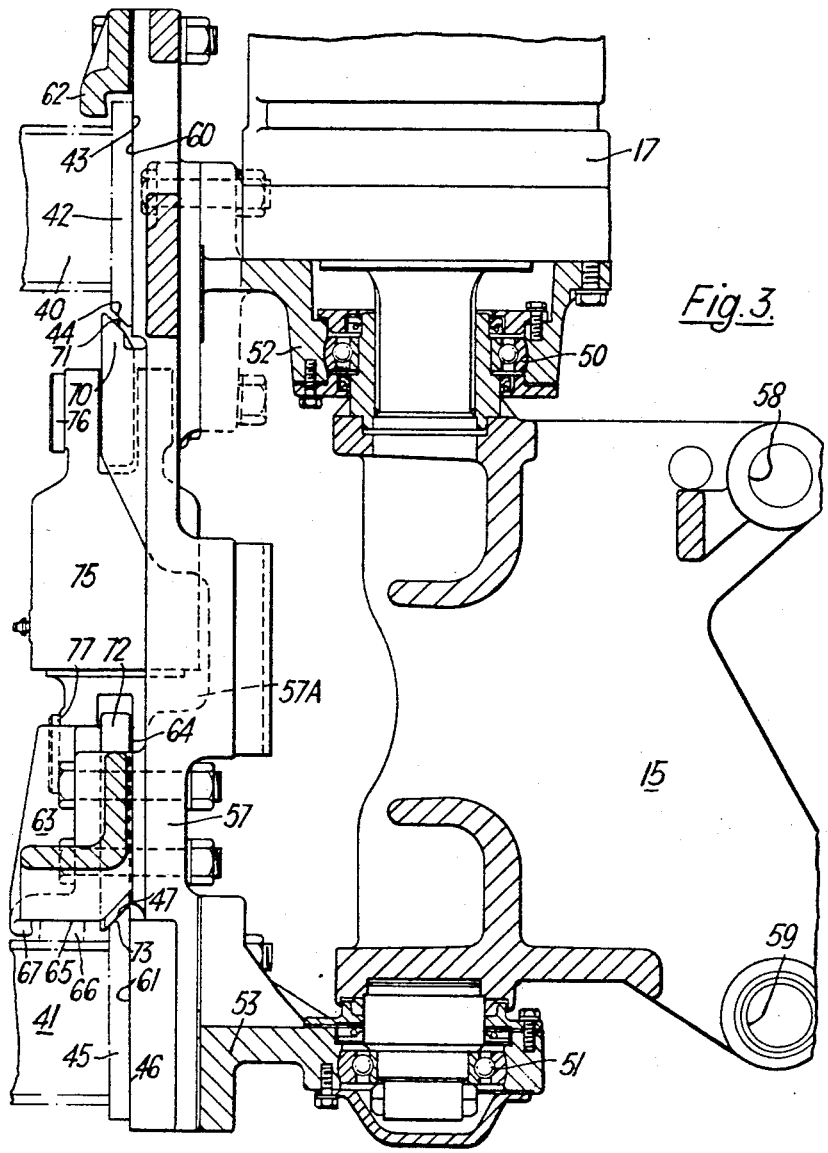

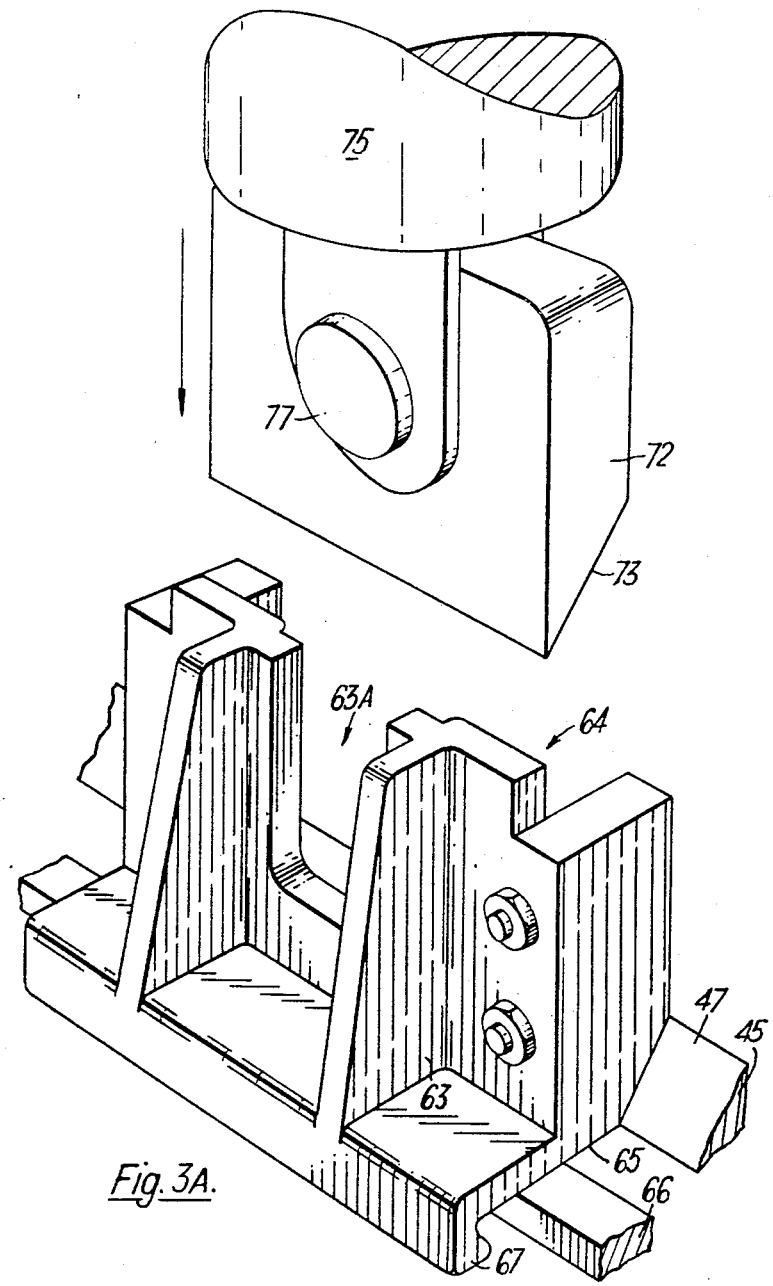

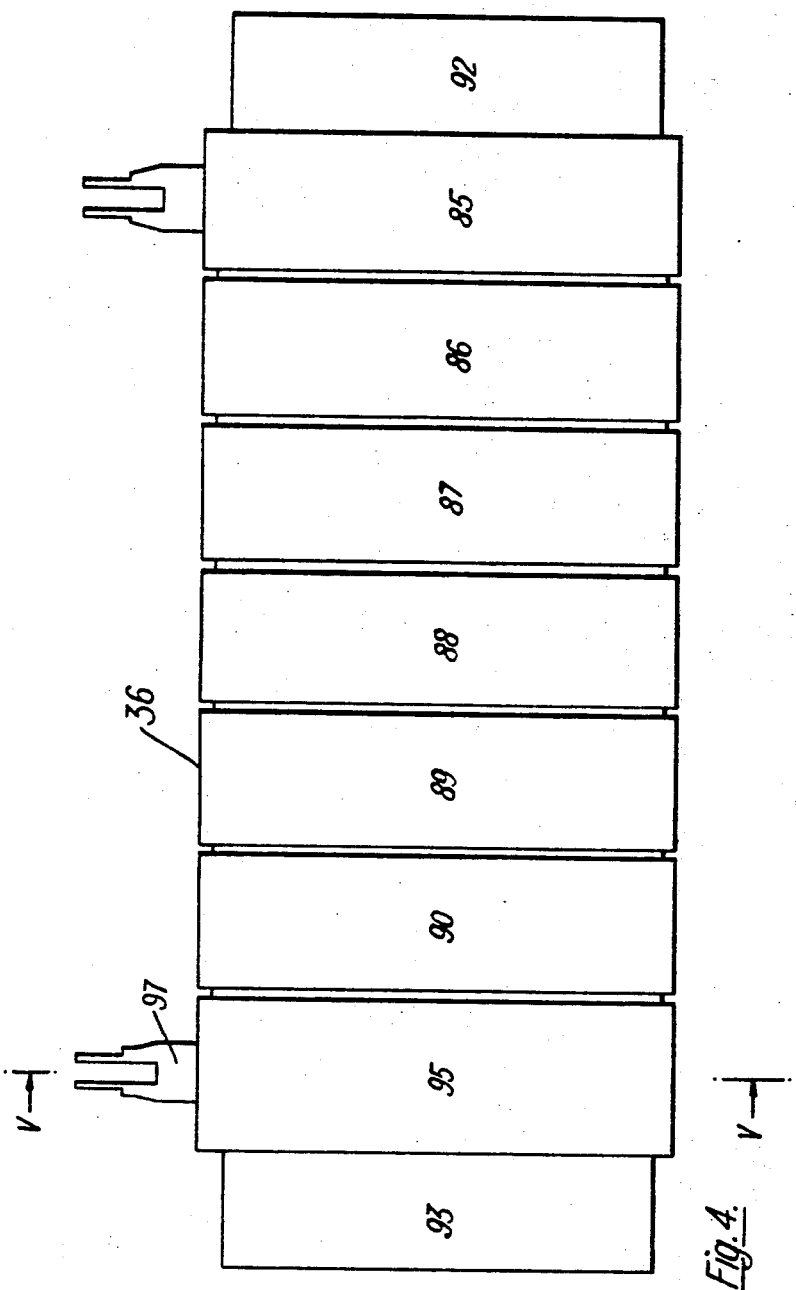

Oct. 15, 1968     D. G. WILLIAMS     3,405,823
HYDRAULIC LOCKING MEANS FOR SHIFTABLE BACKHOE
Filed Jan. 11, 1966     5 Sheets-Sheet 5

Inventor
DERRICK GEOFFREY WILLIAMS
By Tweedale & Gerhardt
Attorneys

United States Patent Office 3,405,823
Patented Oct. 15, 1968

3,405,823
HYDRAULIC LOCKING MEANS FOR
SHIFTABLE BACKHOE
Derrick Geoffrey Williams, Coventry, England, assignor to Massey-Ferguson Services N.V., Curacao, Netherlands Antilles
Filed Jan. 11, 1966, Ser. No. 519,919
Claims priority, application Great Britain, Jan. 20, 1965, 2,584/65, 2,586/65
13 Claims. (Cl. 214—138)

ABSTRACT OF THE DISCLOSURE

A backhoe boom support assembly in which a boom supporting bracket is slideably mounted on a tractor supported frame, and including hydraulic locking apparatus for securing the bracket against movement at any selected position along the frame. A control system is provided for the hydraulic locking means and boom actuators that operates to increase the pressure in the hydraulic locking means as the pressure in the boom actuators increases under load to prevent undesired shifting of the boom on the frame.

---

This invention relates to clamping apparatus and relates especially but not exclusively to mechanical diggers and excavators, mechanical shovels and earth shifting apparatus hereinafter referred to simply as "mechanical diggers." This application is related to my copending application Ser. No. 519,920 filed on even date herewith.

Such mechanical diggers ordinarily have a rigid upright frame which can be attached to the rear of a vehicle in a position transverse to the longitudinal central plane of the vehicle. The frame carries a boom for supporting the digging implement and the inner end of the boom is pivoted to an upright swivel post mounted on the frame. The mechanical digger boom is generally operated by hydraulic actuators.

In order to operate the boom and digging implement in such a manner as to work closely alongside a limit beyond which the vehicle frame cannot be stationed, for instance to dig a narrow trench alongside an obstructing structure such as a foundation, or a frame, the swivel post may be mounted in guideways on the frame so that it can be moved to a selected position along the frame. For digging under these conditions the swivel post will be mounted at one end of the frame. It is of course necessary, once the digging position has been selected, to lock the swivel post to the frame to prevent transverse sliding during operation.

It is an object of the invention to provide effective clamping apparatus for clamping the swivel post to the frame.

According to the present invention we provide clamping apparatus comprising a slideway having two mutually convergent side faces and at least one abutment face, a bracket located on said slideway for sliding movement relative thereto and having mutually convergent surfaces corresponding to and for mating with said convergent side faces, said bracket having at least one abutment face for frictional engagement with said abutment face of the slideway; and pressure-exerting means for effecting relative movement between said side faces and surfaces transversely of the general plane of the slideway so that said clamping faces are brought into clamping engagement.

Also, according to the present invention, we provide clamping apparatus comprising a support defining a slideway, a bracket carried by the support and movable along the slideway, mutually opposed abutment faces respectively on the support and bracket, the support and bracket being relatively movable transversely of the general plane of the slideway so as to move said abutment faces into or out of clamping engagement, and means for effecting said movement comprising slideway faces mutually convergent transversely of the general plane of the slideway and relatively movable members on said bracket having spaced surfaces mating with said faces, and a pressure-exerting device adapted to press on said members so that their faces co-act with said mating surfaces to effect said clamping engagement between the abutment faces.

In order that the invention may be more clearly understood, an embodiment will now be described, by way of example, with reference to the accompanying drawings in which:

FIG. 1 is a side view of a mechanical digger according to the invention, and attached to the rear end of a tractor;

FIG. 2 is a plan view to a smaller scale of the tractor and mechanical digger shown in FIG. 1, and also shows various positions of the digger in the tractor;

FIG. 3 is a side view of the frame connecting the digger to the tractor;

FIG. 3A is an enlarged perspective view of a detail of FIG. 3;

FIG. 4 is a diagrammatic view of part of a hydraulic system by means of which the digger is controlled.

Figure 5:
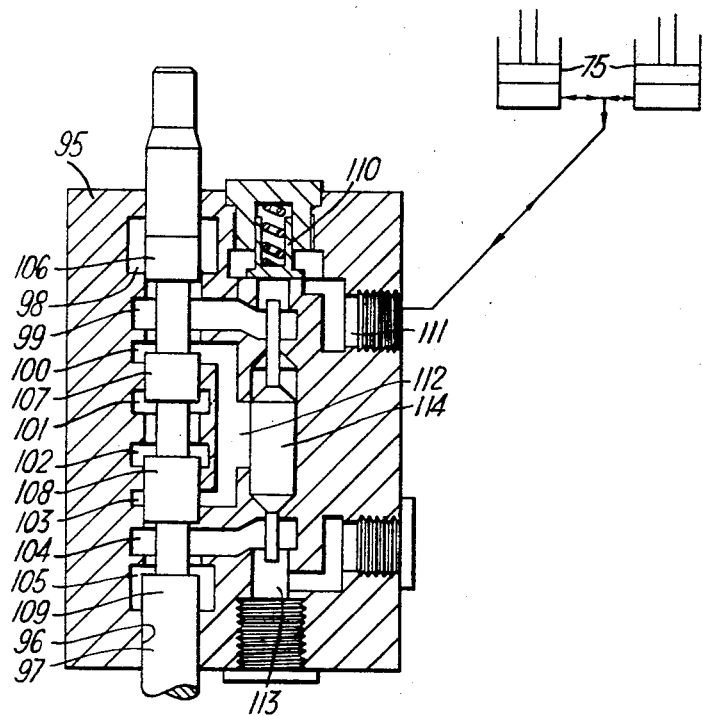
FIG. 5 is a sectional view on the line 5—5 of FIG. 4.

Referring firstly to FIG. 1, a mechanical digger includes a generally rectangular vertical frame 10 mounted on the rear of a tractor 11 by means of suitable brackets 12 and tie rods 13. Mounted on the frame in a manner to be described is a swivel post assembly 14 including a swivel post 15 pivotally mounted in a suitable bracket structure 16 attached to the frame. Rotation about a vertical axis of the swivel post 15 is controlled by a rotary hydraulic actuator 17.

A digger boom 18 is pivotally mounted on a pin 19 at the lower end of the post 15 and a hydraulic jack 20 extends between the boom and the swivel post to control its vertical movement about the pin 19. The rear end of the boom carries a pin 21 on which is mounted, for pivotal movement, a dipper stick 22. The upper end of the dipper stick extends above the boom and is connected to a hydraulic jack 23 having its other end connected at 24 to the boom superstructure 25. The lower end of dipper stick is provided with a pin 26 on which a bucket 27 is mounted for pivotal movement. A hydraulic jack 29 extending between the dipper stick and the bucket 27 is provided to control the pivotal movement of the latter about the pin 26.

Also provided, one at each outer extremity of the frame 10, are a pair of stabilizer legs 31 which are slidable vertically in hollow tubes 32 of rectangular cross section forming the ends of the frame 10. The position of the stabilizer legs 31 is controlled by the use of hydraulic jacks (not shown), provided in the tubes 32.

When using the digger, the operator occupies a seat 35 to face a hydraulic valve control bank 36 provided with the necessary levers 37 to operate the valves controlling the various hydraulic actuators above mentioned.

Referring now to FIGS. 3 and 3A, the digger frame vertical tubes 32 are interconnected by vertically spaced horizontal cross members 40, 41. Rigidly attached to the rear faces of the cross members 40, 41 is a slideway comprising two parallel spaced slideway guides 42, 45 extending substantially the full width of the frame. The guide 42 is of relatively narrow cross section and includes edges projecting respectively above and below the cross member 40 and a rearwardly facing vertical surface 43. The lower edge of the slideway guide 42 is chamfered to provide an upwardly and forwardly inclined face 44. The lower cross member 41 carries slideway guide 45 which has a rearwardly facing surface 46 and an upper edge chamfered to provide a downwardly and forwardly inclined face 47.

Also provided is a bracket 57 which is adapted to slide on the slideway guides and which has a retaining edge 62 hooked over the top edge of the slideway guide 42. Attached to the bracket 57 are a pair of flanges 52, 53 in which the swivel post 15 is rotatably supported in an upright manner. The flange 52 also supports the swivel post hydraulic actuator 17. The swivel post 15 includes upper and lower bearing holes 58, 59 for the reception of a pin for the boom jack 20 and the boom pivot pin 19, respectively.

In addition, the bracket 57, which is generally vertical, includes upper and lower forwardly facing surfaces 60, 61 which are respectively opposite the surfaces 43 and 46 on the frame slideway guides 42, 45. At its lower end, the bracket 57 is provided with a pair of laterally spaced lugs 63, each defining a rectangular open ended slot 64 (FIG. 3A), bounded by the lug 63 and the bracket 57. Each lug 63 has a lower bearing surface 65 which, in the condition shown in FIG. 3 rests on a block 66 mounted on the upper surface of the lower cross member 41. Each lug is also provided with a downwardly projecting lip 67 to prevent separation of the frame 10 and the bracket 57.

The bracket 57 also includes a projecting portion 70 having a forwardly and upwardly inclined face 71 for cooperation with the surface 44 on the upper slideway. Each of the slots 64 slidably receives a locking plate 72 having at its lower end a rearwardly and upwardly inclined surface 73 for cooperation with the surface 47 on the lower slideway (FIG. 3A).

A pair of laterally spaced hydraulic jacks 75, only one being shown, are mounted at their upper ends on pins 76 passing through holes in the bracket 57. The other end of each jack 75 is connected to an appropriate one of the locking plates 72 by a pin 77. There are suitable notches 63A and 57A in the bracket 57 and lug 63 to allow vertical movement of the pin 77 relative thereto. The locking plate 72 can of course slide in the slot 64.

The hydraulic jacks 75 are connected to suitable control means accessible to the operator and which may be incorporated in the control block 36.

In operation, under the conditions shown in FIG. 3, the jacks 75 are not under pressure and the weight of the swivel post assembly 14 is transmitted to and borne by the frame 10 through the lugs 63 resting on the block 66. In this position the lower surfaces 46, 61 are in contact.

Referring now to FIG. 2, which shows a diagrammatic plan view of the digger, it will be seen that the digger assembly is in the central position 80 on the frame 10. Assume now that it is required to dig parallel, and close, to an obstruction 81. To enable this the digger assembly requires moving to the position 82.

In order to effect such movement, the stabilizers 31 are first lowered and the actuator 17 operated to cause the boom to swing anti-clockwise, as viewed in FIG. 2, until it is close, and as near as possible parallel, to the frame 10. The actuators 20, 23 and 29 are then operated to cause the bucket 27 to dig into the ground. If the pressure in the jacks 75 is removed by virtue of the bucket 29 digging into the ground, the effect is to pull on the bracket 57 which in turn causes the swivel post assembly to move along the slideways to the desired position 82.

When this position is reached, pressure is supplied to the jacks 75 causing them to extend. The inclined surface 73 on the locking plate 72 will first contact the corresponding surface 47 on the bracket 57, when the complete swivel post assembly will be lifted until the inclined surfaces 44 and 71 are in contact. Further application of pressure fluid will then have the effect of moving the swivel post assembly 14 forwardly until the vertical surfaces 43, 60 and 46, 61 are in tight contact, thus causing a large area of frictional contact between the slideway guides 42, 45 and the bracket 57, and the inclined surfaces to lock the bracket 57 in the desired position on the frame 10.

The method described is only one method of sliding the boom assembly to a suitable position and uses the existing hydraulic services; other methods may be used. For instance, the boom may be initially swung away from the direction in which it is to be moved, and the jacks operated to increase the distance between the bucket and swivel post. Also, the bucket jack 29 may be used during the sliding movement to curl the bucket towards the swivel post and to provide the main source of power, suitable corrections being made to the actuators 20, 23.

Moreover it is not necessary that the above clamping apparatus be used only with a mechanical digger but, as will be appreciated it may be used with for example, a machine tool having a working head slidable on a base plate, and indeed may have many other applications.

While the jack 75 may be operated by any suitable means such, for example, as a control valve having a feed position, a neutral position and a discharge position, it is preferred that the arrangement of FIG. 4, be used. FIG. 4 is a diagrammatic representation of the valve control block 36 and shows a series of six open center three position valves; valves 85 and 86 are for controlling the stabilizer actuators 31; valve 87 is for controlling the boom actuator 20; valve 88 is for controlling the slew actuator 17; valve 89 is for controlling the dipper stick actuator 23; valve 90 is for controlling the bucket actuator 29.

Inserted in the valve assembly prior to the end pressure plate 93, which receives the fluid supply from the hydraulic pump, is a two position valve assembly 95 for controlling the locking actuators 75.

The actual design of each of the valves is immaterial and it is sufficient to note that each has a central neutral position and positions to either side thereof for operating, in one direction or the other, the appropriate actuator. Furthermore, when all seven valves are in the neutral positions, since they are of the open center type, fluid supplied by the pump passes through each of the valves in turn and is returned to the sump through a conduit extending from the end plate 92. It will be manifest that under these conditions, the pressure in the system is very small.

With particular reference to FIG. 5, the valve 95 has a valve housing including a bore 96 having located therein a slidable valve 97. The bore 96 has eight oil galleries 98–105 respectively which may be placed in communication with or blocked from, adjacent ones by lands 106–109 respectively on the valve 97. In the position shown the galleries 98, 101, 102 and 105, are all connected to sump; the gallery 99 is in communication with a one-way check valve 110 which blocks the return passage of oil from a duct 111 leading to the locking actuator 75.

The galleries 100 and 103 are connected to a pressure chamber 112 which extends through the valve and communicates with the hydraulic supply fed into the end plate 93, and which also communicates with a similar pressure chamber in the adjacent valve 90. The gallery 104 is connected to a closed chamber 113 into which one end of a shuttle piston 114 projects. The other end of the piston 114 is situated so that vertical movement of the piston will cause it to contact the check valve 110 and tend to open it.

In the position shown in FIG. 5 the valve 97 is set to lock the swivel post assembly to the main frame, as pressure oil is free to flow from the gallery 100 to the gallery 99 and through the check valve 110 to the locking actuators 75. Also, the chamber 113 is connected through the galleries 104 and 105 to sump so that there is no pressure on the lower end of the shuttle piston 114. As already explained, with all of the valves in the system in the neutral position, there will be very little pressure in the chamber 112. When the valve 97 is in the position shown, it is normally urged by spring bias and if the digger is in operation, as soon as the pressure in any one of the digger actuators which are in communication with passage 112, becomes greater than the pressure in the actuators 75, oil will flow through the check valve 110 to increase the clamping pressure. The check valve 110 prevents release of this pressure even when the pressure in the other actuators drop.

It is very likely that there may be a slight leakage at some time or other from the actuators 75, but this arrangement is very advantageous in that this is automatically compensated for during normal working of the digger. More specifically, the actuators 75 will be "topped-up" periodically automatically and the operator will not be required to give them special attention.

If now the valve 97 is moved upwardly from the position shown in FIG. 5, the gallery 99, and hence the chamber 111, is placed in communication with the sump through the gallery 98. Also the pressure chamber 112 is placed in communication with the chamber 113 through the galleries 103 and 104. This means that a pressure will be exerted on the lower face of the piston 114 causing it to move upwardly and open the check valve 110 to allow fluid to pass from the actuators 75 to sump through the gallery 98, thus unlocking the swivel post assembly.

The valve 97 is held in this position preferably by the use of a locking detent associated with its actuating lever.

The swivel post assembly may now be moved to its new desired position on the main frame 10 and as soon as this is reached the valve 97 is returned manually to the position shown in FIG. 5, and any one of the valves 85–90 actuated to operate the digger and at the same time to cause pressure fluid to flow to the locking actuators 75 to lock the assembly in its new position.

It will be appreciated that the above described hydraulic system can be used in any apparatus having two or more hydraulic actuators, one of which anchors the apparatus to a fixture, and the other of which is load handling.

I claim:

1. Clamping apparatus comprising a slideway having two mutually convergent side faces and at least one abutment face, a bracket located on said slideway for sliding movement relative thereto and having mutually convergent surfaces corresponding to and for mating with said convergent side faces, said bracket having at least one abutment face for frictional engagement with said abutment face of the slideway; a hydraulic actuator for effecting relative movement between said side faces and surfaces transversely of the general plane of the slideway so that said clamping faces are brought into clamping engagement, a further hydraulic actuator for external work, and a hydraulic locking unit connected to said actuators and adapted and arranged so that in operation, the pressure in the first mentioned actuator is raised to that of the further actuator when the pressure in the latter exceeds that of the first-mentioned actuator.

2. Clamping apparatus according to claim 1, in which the hydraulic locking unit is connected to a bank of hydraulic control valves of the open center type having their supply pressure fluid chambers in series communication.

3. Clamping apparatus according to claim 2 in which the hydraulic locking unit comprises a valve assembly having an input for pressure fluid, an output connected to said clamping actuator, a main pressure fluid chamber an output pressure fluid chamber, a releasing pressure fluid chamber, a check valve, means operable to open said check valve, and a slidable valve, said input communicating with said main pressure chamber, said output communicating with said output pressure chamber through said check valve, said releasing pressure chamber being associated with said means operable to open the check valve, and said slidable valve being operable to allow, in one position, communication between the main pressure chamber and the output pressure chamber, and communication between the releasing pressure chamber and a sump, and, in another position, communication between the main pressure chamber and the releasing pressure chamber, and communication between the output pressure chamber and the sump, in which position the means operable to open the check valve may operate so as to release pressure in the clamping actuator.

4. Clamping apparatus according to claim 3, in which said means operable to open the check valve comprises a shuttle piston axially slidable in a bore and having end extensions of reduced diameter, of which one enters said releasing pressure chamber and of which the other enters the output pressure chamber and can abut the check-valve and move same to the open position.

5. Clamping apparatus according to claim 4, in which said slidable valve has a plurality of pistons fixed thereon spaced along its axis, said pistons being slidable in bores to positions of venting or permitting communication between the pressure chambers and the sump as aforesaid.

6. A hydraulic control system for clamping a bracket to a support and having at least two hydraulic actuators the first of which is operable to effect clamping, and a second of which is for external work, a hydraulic locking unit which is connected to said actuators and adapted and arranged so that in operation the pressure in the first actuator is raised to that of the second actuator when the pressure in the latter exceeds that of the first actuator so as to increase the clamping effect, and in which the hydraulic locking unit is connected to a bank of hydraulic control valves of the open center type having their supply pressure fluid chambers in series communication.

7. A hydraulic control system according to claim 6, in which the hydraulic locking unit comprises a valve assembly having an input for pressure fluid, an output for connection to said clamping actuator, a main pressure fluid chamber, an output pressure fluid chamber, a releasing pressure fluid chamber, a check valve, means operable to open said check valve, and a slidable valve, said input communicating with said main pressure chamber, said output communicating with said output pressure chamber through said check valve, said releasing pressure chamber being associated with said means operable to open the check valve, and said slidable valve being operable to allow, in one position, communication between the main pressure chamber and the output pressure chamber, and communication between the releasing pressure chamber and a sump, and in another position, communication between the main pressure chamber and the releasing pressure chamber, and communication between the output pressure chamber and a sump, in which position the means operable to open the check valve may operate so as to release pressure in the clamping actuator.

8. A hydraulic locking unit comprising a valve assembly having an input for pressure fluid, a clamping actuator, an output for connection to said clamping actuator, a main pressure fluid chamber, an output pressure fluid chamber, a releasing pressure fluid chamber, a check valve, means operable to open said check valve, and a slidable valve, said input communicating with said main pressure chamber, said output communicating with said output pressure chamber through said check valve, said releasing pressure chamber being associated with said means operable to open the check valve, and said slidable valve being operable to allow, in one position, communication between the main pressure chamber and the output pressure chamber, and communication between the releasing pressure chamber and a sump, and, in another position, communication between the main pressure chamber and the releasing pressure chamber, and communication between the output pressure chamber and the sump, in which position the means operable to open the check valve may operate so as to release pressure in the clamping actuator.

9. A hydraulic locking unit according to claim 8, in which said means operable to open the check valve comprises a shuttle piston axially slideable in a bore and having end extensions of reduced diameter, of which one enters said releasing pressure chamber and of which the other enters the output pressure chamber and can abut the check-valve and move same to the open position.

10. A hydraulic locking unit according to claim 9 in which said slideable valve has a plurality of pistons fixed thereon spaced along its axis, said pistons being slideable in bores to positions for preventing or permitting communication between the pressure chamber and the sump as aforesaid.

11. A hydraulic locking unit according to claim 10, in a bank of hydraulic control valves of the open center type having their supply pressure fluid chambers in series communication, said main pressure fluid chamber corresponding to said pressure fluid supply chambers.

12. A hydraulic locking unit according to claim 11 in which said output is connected to one or more hydraulic clamping actuators, and said hydraulic control valves being connected to one or more load handling hydraulic actuators, whereby the pressure in said clamping actuators is raised to that in said load handling actuators when the pressure in the load handling actuators exceeds the pressure in the clamping actuators.

13. In a backhoe and the like, a frame adapted to mount on a tractor, a pair of vertically spaced, parallel cross members on said frame, a slideway guide mounted on each of said cross members, a boom supporting bracket slideably mounted on said slideway guides for lateral movement along said frame, at least one pair of movable clamping members carried by said bracket each of which is engageable with one of the slideway guides, and hydraulic actuating means connected with said movable members operable to selectively actuate said movable members into clamping engagement with their respective slideway guides to secure the bracket against movement along the frame, said hydraulic actuating means including an extensible hydraulic actuator engaged with each of said movable members, a backhoe boom assembly on the boom supporting bracket, a second hydraulic actuator for operating the boom assembly, and control means for said actuators for preventing the pressure in said second actuator from exceeding that in said first named actuator.

References Cited
UNITED STATES PATENTS
| | | | |
|---|---|---|---|
| 3,155,250 | 11/1964 | French et al. | 214—138 |
| 3,173,673 | 3/1965 | Northern et al. | 269—32 |
| 3,304,100 | 2/1967 | Long | 214—138 X |

FOREIGN PATENTS
| | | |
|---|---|---|
| 1,088,896 | 9/1960 | Germany. |
| 972,208 | 11/1964 | Great Britain. |

HUGO O. SCHULZ, *Primary Examiner.*